Dec. 19, 1967   W. A. FISCHER   3,359,188
METHODS AND APPARATUS FOR DETERMINING THE OXYGEN ACTIVITY
OF MOLTEN METALS, METAL OXIDES AND SLAGS
Filed Jan. 2, 1964
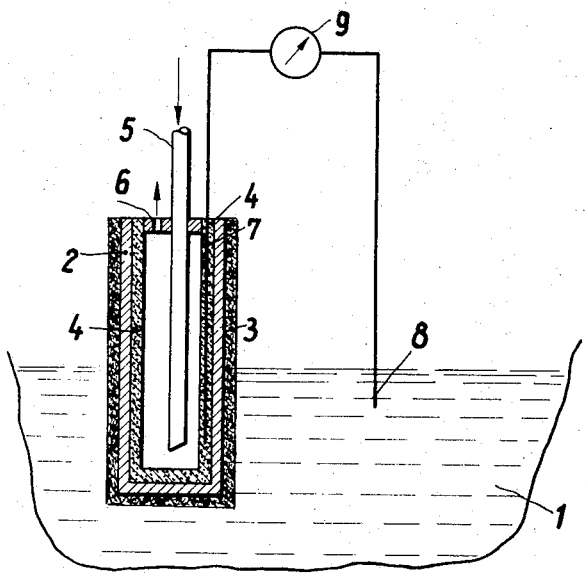
Inventor:
Wilhelm Anton Fischer United States Patent Office 3,359,188
Patented Dec. 19, 1967

3,359,188
METHODS AND APPARATUS FOR DETERMINING THE OXYGEN ACTIVITY OF MOLTEN METALS, METAL OXIDES AND SLAGS
Wilhelm Anton Fischer, Ratingen, Germany, assignor to Max-Planck-Institut fur Eisenforschung, Dusseldorf, Germany, a German body corporate
Filed Jan. 2, 1964, Ser. No. 335,144
Claims priority, application Germany, Jan. 5, 1963, M 55,334
8 Claims. (Cl. 204—1)

ABSTRACT OF THE DISCLOSURE

Disclosed are method and apparatus for determining the oxygen activity of liquid metals, metal oxides and slags. The apparatus comprises a gas impermeable receptacle made of a mixed oxide, capable of conducting oxygen ions. Gas-pervious zirconium-oxide layers form the outside and inside walls and base of the receptacle. An inner comparison electrode is disposed in the space bounded by the receptacle. An outer, measuring electrode for dipping into the metal or other substance and a voltage measuring device interconnecting the two electrodes completes the apparatus. According to the invention, an oxygen-containing gas such as air or oxygen, a reducing gas such as carbon monoxide or hydrogen or a solid or liquid oxide having a known oxygen activity is used as a comparison substance.

Conventionally, the oxygen content of metal melts, for instance of iron melts, is determined by hot extraction. Unfortunately, since so much time is required to remove and prepare the specimens for anlaysis and to perform the analysis, the hot extraction process is useless as a quick determination process.

This invention relates to a process and apparatus which obviates these disadvantages and which provide a very rapid determination of the oxygen content of metal and slag melts. Measurement is based on the fact that mixed oxides, such as stabilized zirconium oxide, conduct oxygen ions.

According to this invention, apparatus for determining the oxygen activity of liquid metals, metal oxides and slags comprises a receptacle which is made of a mixed oxide, such as stabilized zirconium oxide, conducting oxygen ions and which is burned to a gas impermeable state, gas-pervious zirconium-oxide layers sintered to the outside and inside of the walls and base of the receptacle, an inner, comparison electrode disposed in the space bounded by the receptacle, an outer measuring electrode for dipping in the metal or other substance and a voltage measuring device interconnecting the two electrodes.

In the process according to the invention in which the device just described is used to determine the oxygen content of liquid metals and of slag melts within a few seconds by measurement of the voltage of a galvanic element in the form of a comparison substance of known oxygen activity, the receptacle is filled with the comparison substance and is dipped into the melt to be tested. The voltage between the melt and the comparison substance is then measured.

If required, the comparison substance can be introduced into the receptacle in a closed package, whereafter the receptacle is tightly closed by a cover. The package melts or gasifies at the high temperature of the melt and releases the comparison substance. It is very advantageous to introduce the comparison substance in this way in cases where it is required to make measurements in industrial furnaces, such as steel-melting furnaces. If required, the measurement can be made on a small sample of the melt which has been removed from the industrial melt.

When the measuring device is dipped into an iron melt in a furnace, in which case the iron melt is usually covered by a slag, some appropriate form of covering, such as an iron pipe or an appropriate ceramic tube or pipe, should be provided to protect the device from the slag. Of course no such covering is required when it is required to measure only the oxygen activity of the slag.

The voltage of the galvanic element can be determined to an accuracy of at least ±1 mv. by compensation using an auxiliary voltage.

An example of a method and apparatus in accordance with the invention will now be described with reference to the accompanying drawing which is a diagrammatic view of the apparatus.

A ladle, furnace hearth or scoop contains a metal melt, such as an iron melt, part of which is denoted by the numeral 1. A receptacle 2 which has been burned until it is impermeable to gases dips into the iron melt; the receptacle 2 is made of a mixed oxide, such as stabilized zirconium oxide, which conducts oxygen ions. A gas-pervious layer 3 is sintered to the outside of the walls and base of the receptacle 2 and a gas-pervious layer 4 of the same oxide is sintered to the inside of the base and walls of the receptacle 2. Air, the substance used as a comparison substance, is introduced into the receptacle interior through an entry tube 5 and is discharged to atmosphere through an outlet 6. A platinum comparison electrode 7 is embedded all the way round in the gas pervious inner zirconium oxide layer 4 and therefore comes into contact with the entering air. A measuring electrode 8 dips into the iron melt and is connected via a voltmeter 9 to the comparison electrode 7.

The receptacle 2 which in this example is stabilized zirconium oxide, together with its covering layers may be made as follows:

A layer of granular stabilized zirconium oxide between 3 and 5 mm. thick which has previously been wetted with an appropriate liquid, such as water, alcohol, glycerine or oil, is tamped onto the bottom of a stabilized zirconium oxide tube which has a wall thickness of from about 1 to 3 mm. and has been burned until it is impermeable to gases and is open at one end. An appropriate granular mixture can comprise, for instance, the following grain size percentages: 25% by weight up to 0.07 mm. grain diameter, 25% from 0.07 up to 0.12 mm., 25% from 0.25 to 0.5 mm., 25% from 0.5 to 1 mm. diameter. A conical core is then introduced into the interior of the zirconium oxide tube to leave a gap of from about 3 to 5 mm. After the comparison electrode, for instance, of platinum, has been introduced, the gap is tamped up with more granular material. The tube is then introduced into a divisible tamping mould whose base is covered by tamping compound, whereafter the gap between the tamping mould and the tube outer wall is tamped full of wet granular material. After the core and the tamping mould have been removed, the receptacle, which now has three layers, is burned in a furnace at from about 1500 to 1700° C.

The stabilized zirconium oxide gas-pervious layer, instead of being applied by tamping, can be applied to the impermeable zirconium oxide tube after burning by the so-called slip process.

When the device according to the invention is dipped into a completely deoxidized steel melt which has a temperature of 1600° C. and whose oxygen content is below 0.001%, the measured voltage is 1450 mv. An oxygen-saturated steel melt having about 0.26% oxygen content gives a reading of 500 mv. An oxygen-content range from less than 0.001% to 0.26% is therefore covered by a voltage range of 1000 mv.; individual measured values can readily be determined, by the known electric compensation measuring processes, to an accuracy of at least ±1 mv. The accuracy of measurement of the process according to the invention is therefore at least equal to the accuracy of hot-extraction analysis. An iron melt having 0.12% oxygen content whose measured voltage was 700 mv. was completely deoxidized by aluminum and its voltage was then 1450 mv., corresponding to a dissolved oxygen content of less than 0.001%.

As previously stated, there is a logarithmic relationship between measured voltage and oxygen activity—i.e., oxygen content. Since the voltage to be measured varies with temperature, the melt to be tested must have its temperature determined, for instance, by a dip measurement.

The process according to the invention can be used to determine the oxygen activity, i.e., the oxygen content which can be calculated therefrom by the activity coefficient, of metal melts very rapidly within a few seconds. Only the oxygen dissolved in melts is determined. For hot extraction, however, a frozen specimen which must be treated mechanically is required, and so the analysis value of the oxygen dissolved in the metal melt is often falsified by an oxygen increase and by oxidic accompanying elements.

I claim:

1. Apparatus for determining the oxygen activity of liquid metals, metal oxides and slags, the apparatus comprising a gas impermeable receptacle which is made of a mixed oxide, capable of conducting oxygen ions, gas-pervious zirconium-oxide layers forming the outside and inside of the walls and base of the receptacle, an inner, comparison electrode disposed in the space bounded by the receptacle, an outer, measuring electrode for dipping in the metal or other substance and a voltage measuring device interconnecting the two electrodes.

2. Apparatus according to claim 1, wherein the receptacle is made of stabilized zirconium oxide.

3. A method of determining the oxygen activity of liquid metals, metal oxides and slags, which comprises dipping a comparison electrode and a measuring electrode, separated from each other by a voltage measuring device interconnecting the two electrodes, into the melt to be tested; the measuring electrode being embedded within a gas pervious zirconium-oxide layer forming the inner wall of a receptacle made of a gas impermeable mixed oxide capable of conducting oxygen ions; filling said receptacle with a comparison substance and measuring the voltage between the comparison substance and the melt.

4. The method according to claim 3, wherein an oxygen containing gas is used as the comparison substance.

5. The method according to claim 4, wherein the gas is selected from air and oxygen.

6. The method according to claim 3, wherein a reducing gas is used as the comparison substance.

7. The method according to claim 6, wherein the gas is selected from carbon monoxide and hydrogen.

8. The method according to claim 3, wherein an oxide having a known oxygen activity is used as the comparison substance.

References Cited

UNITED STATES PATENTS 3,297,551   1/1967   Alcock _____ 204—195

OTHER REFERENCES

Steinmetz et al., UNC Report No. 5032, August 1962.
Kiukkola et al., "J. of the Electrochemical Soc.," 1957, pp. 379–387.

ROBERT K. MIHALEK, *Primary Examiner.*

JOHN H. MACK, *Examiner.*

T. TUNG, *Assistant Examiner.*